Aug. 18, 1931.  W. G. WOOD  1,819,726
LIGHT PROJECTOR
Filed Nov. 21, 1928    3 Sheets-Sheet 1
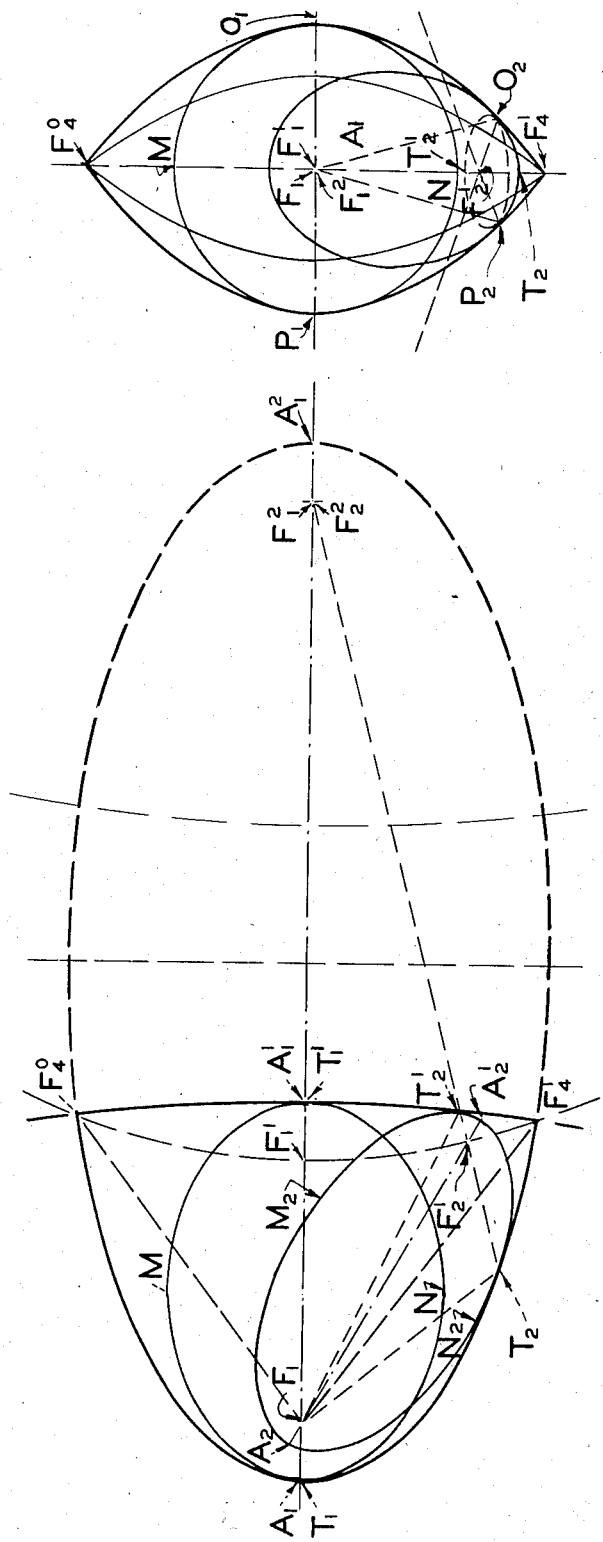
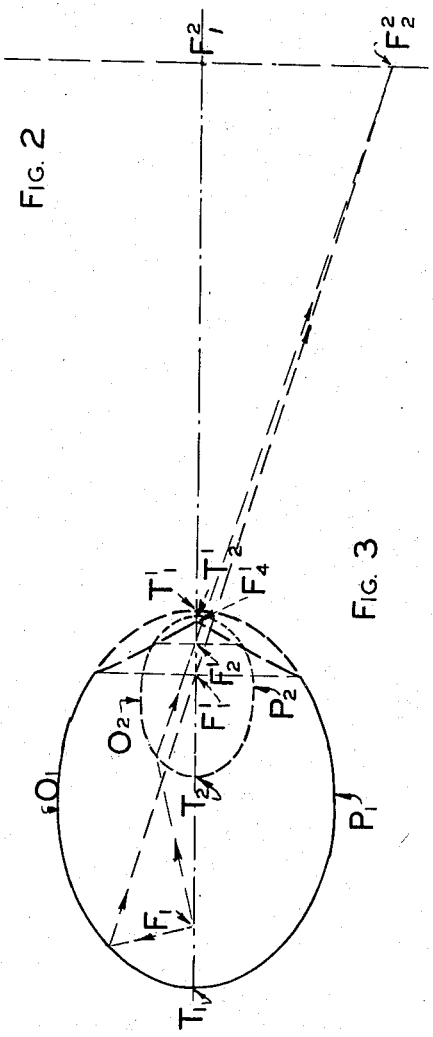
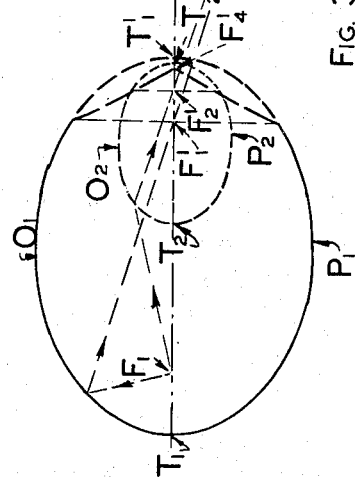
INVENTOR.
William G. Wood.
BY
Townsend Loftus & Abbett
ATTORNEYS.

Aug. 18, 1931.  W. G. WOOD  1,819,726
LIGHT PROJECTOR
Filed Nov. 21, 1928   3 Sheets-Sheet 2

INVENTOR.
William G. Wood.
BY
Townsend, Loftus & Abbett
ATTORNEYS.

Aug. 18, 1931.  W. G. WOOD  1,819,726
LIGHT PROJECTOR
Filed Nov. 21, 1928   3 Sheets-Sheet 3
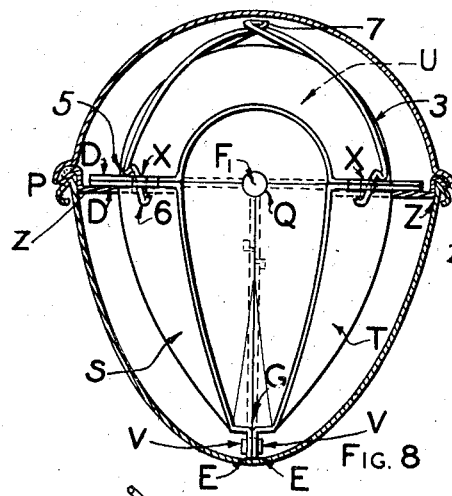
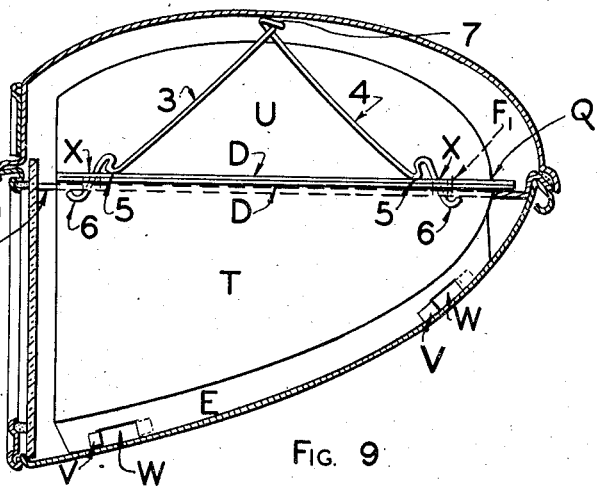
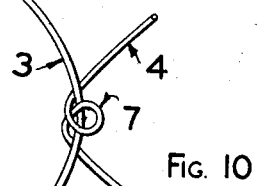
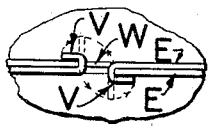
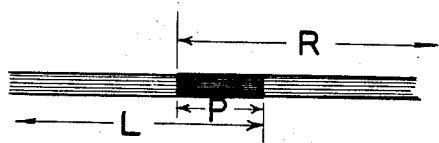
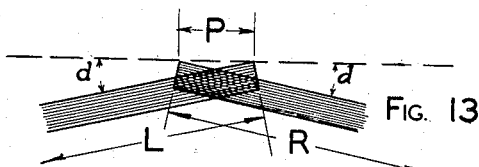
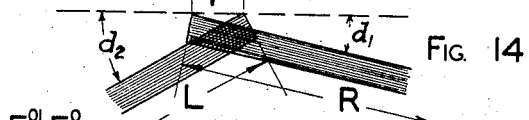
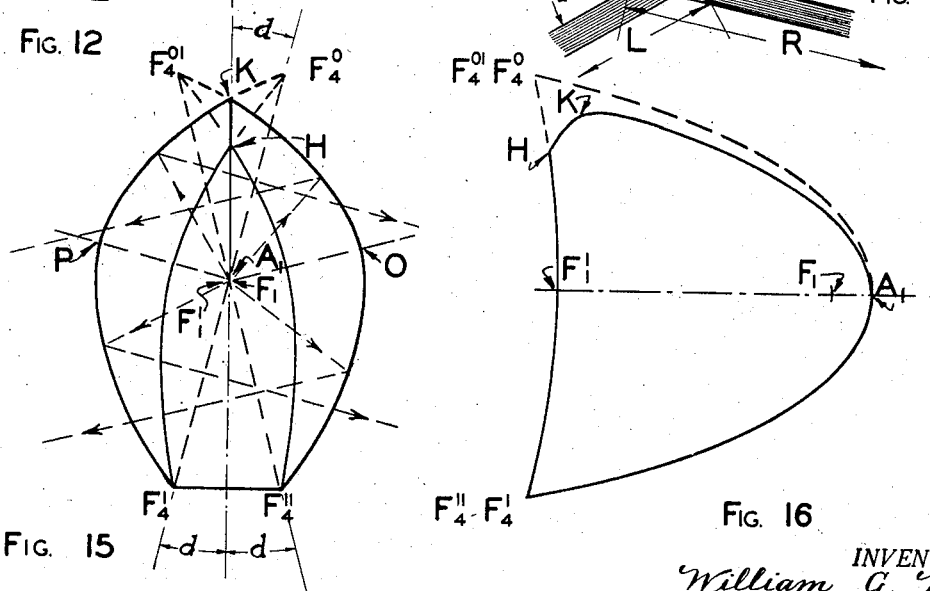
INVENTOR.
William G. Wood
BY Townsend, Loftus & Atkett
ATTORNEYS.

Patented Aug. 18, 1931

1,819,726

UNITED STATES PATENT OFFICE

WILLIAM G. WOOD, OF SAN FRANCISCO, CALIFORNIA, ASSIGNOR TO AMERICAN WOODLITE CORPORATION, OF SAN FRANCISCO, CALIFORNIA, A CORPORATION OF CALIFORNIA

LIGHT PROJECTOR

Application filed November 21, 1928. Serial No. 320,808.

This invention relates to projectors for light and other waves, and, in combination with suitable light producing means, housing means, and mounting and adjusting means, incorporates a novel reflecting surface for producing a beam of light of high axial intensity having limited vertical spread but with wide lateral spread, the rays in the beam being approximately horizontal in the axial forward direction but being depressed below the horizontal in the lateral portions thereof. In other words, the beam, being horizontal centrally, is adapted for use in automobile headlighting and the like, for the illumination of distant objects ahead, while the wide lateral spread with depressed extremities is adapted to adjacent side illumination.

In my pending application, Serial Number 99,684, filed April 5, 1926, I show in a light projector, an upper portion of hemiellipsoidal shape and a lower portion having for its median vertical profile an arc of a long ellipse, one focus of which is at the position of the light source, the other focus being at a distant point on the same horizontal plane as the light source. Said lower portion has elliptical arcs for contours on sections cut by planes converging to a transverse horizontal line through the said distant point, said ellipses being elements of a family of ellipsoids of revolution having one focus at the position of the light source, the other foci being disposed on a circular arc which lies in the median vertical plane and whose center is the said distant point.

Theoretically, this reflector will project light, originating at the principal focus, in planes of a horizontal pencil of planes to converge at the axis thereof, which is the transverse horizontal line through the said distant point; but it was contemplated that, in practice, due to the size of the filament of the commercial light bulb, the beam would be of somewhat uniform vertical spread. For vehicle headlighting such a beam is not ideal. The permissible light bulbs are of too low candlepower, and the area illuminated is too great, to give a strong central beam. Furthermore, the lateral extremities of this beam are too highly elevated to be effectual for road lighting.

In the co-pending case herein cited, it is shown that the contour of the lower reflector causes the reflected light rays to cross, within the aperture, on the said circular arc in the median vertical plane. In other words, the right hand side of the reflector projects its rays into the left hand side of the beam, and vice versa.

In the invention disclosed herein I am able to increase the intensity of the central portion of the beam of light by displacing angularly the two halves of the above mentioned reflector to cause an overlapping of a portion of the beams from each of the two sides. This is accomplished by separating the right hand and the left hand halves of the reflector, the position of the proximate focus remaining fixed and common to each half. Furthermore, I am able to depress the lateral portions, or wings, of the light beams, i. e., the side lighting, by rotating upwardly the side of the reflector which reflects the beam, viz., the side opposite the half of the beam to be depressed, the axis of rotation being the line connecting the proximate focus and the remote forward focus on the horizontal line. Thus by a combination of angular displacements in both horizontal and vertical directions, and about the principal focus as a center, I am able to intensify the central light beam and also cause a depression of the lateral portions thereof.

By opening outwardly the two lateral halves of the above mentioned reflector there will be formed an angular open section in the reflecting surface. I fill this open section with a reflecting surface which longitudinal planes intersect in arcs of conic sections conforming to the median profiles of the said lateral halves. The arcs defining the median profile of the former reflector now intersect, due to the angular displacement of the sides of the former reflector, and the said intersecting arcs define the curvature of the section placed in the above mentioned angular open section.

Further improvements in this reflector are also herein disclosed. I find that the mechanical operations of forming and finishing the concave inner surface of the reflector are simplified by constructing the same in separate portions, the upper hemiellipsoid and the lower portion of the reflector being parted on the median horizontal plane (i. e., through the horizontal plane containing the principal focus) and the lower portion itself being parted on its median plane.

For convenience, the term "conoloid" is herein used to define a surface of the general contour of the reflector disclosed in my said prior application; that is to say, it is the envelope of a family of prolate ellipsoids of revolution having constant length of major axes, the proximate foci of which are fixed and common to all members of the family, the major axes lying in a plane and the remote foci lying upon the arc of a circle whose center lies in the plane of the major axes and is exterior to the generated surface. When the center of the circular arc is at infinity, the arc becomes a straight line. Said arc may be either convex or concave with respect to the proximate focus, depending upon whether it lies between the proximate focus and the exterior point or behind the proximate focus.

The following description and accompanying drawings explain the details of my invention.

Figs. 1, 2 and 3 are side elevation, front elevation, and plan view, respectively, of the geometrical figure herein defined by the word "conoloid."

Figs. 8 and 9 are front and side elevations, respectively, of my light reflector, showing the means which I employ to hold the several parts of the reflector in a rigid unit.

Fig. 10 shows the details of the spring locking bail which binds the upper and lower portions of the reflector.

Fig. 11 shows in detail the method of holding rigidly together the flanges of the lower part of the reflector by means of folded metal tongues.

Fig. 12 is a representation of the theoretical light beam having an overlapping central portion.

Fig. 13 represents the theoretical light beam with an overlapping central portion and symmetrically deflected lateral portions.

Fig. 14 shows the light beam with asymmetrically deflected lateral portions.

Figs. 15 and 16 are front and side elevations, respectively, of a conoloid arranged to project a beam having depressed lateral portions from a top as well as a bottom reflecting member.

Figure 4:
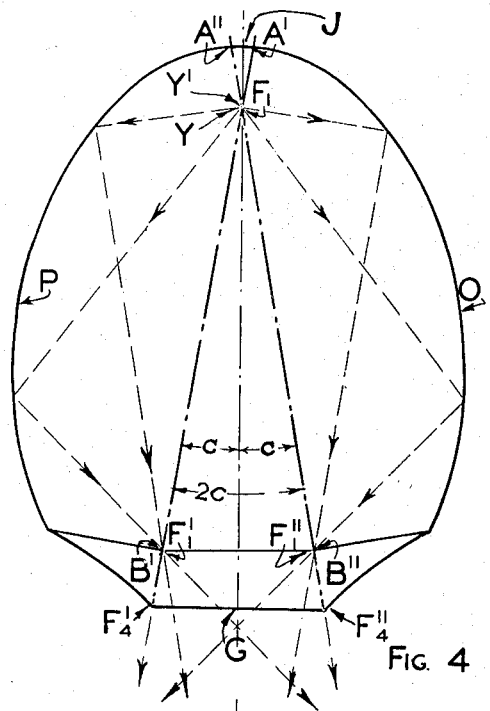
Fig. 4 is the plan view.

In my pending application, Serial Number 99,684, I show the geometrical construction of a surface having a point for the fixed proximate focus and a line for the locus of the remote foci of all superficial elemental areas. In Figs. 1, 2 and 3, I show this geometrical figure and have coined the word "conoloid" to represent it. $F_4{}^0 A_1\ F_4{}^1\ A_1{}^1\ F_4{}^0$ in Fig. 1, $F_4{}^0\ P_1\ F_4{}^1\ O_1\ F_4{}^0$ in Fig. 2, and $T_1\ P_1\ T_1{}^1\ O_1\ T_1$ are three views thereof.

In Fig. 1, $A_1\ NA_1{}^1\ M$ is an ellipse with its proximate focus at a fixed point $F_1$, its remote focus at $F_1{}^1$, and its major axis at $A_1\ A_1{}^1$. The length of this axis is fixed and equal in length to the major axes of the series of generating ellipsoids. $F_1{}^2$ is an exterior point on the axis $A_1\ A_1{}^1$ and $F_4{}^0\ F_1{}^1\ F_2{}^1\ F_4{}^1$ is a circular arc with center at $F_1{}^2$ and radius $F_1{}^1\ F_1{}^2$. If the ellipse $A_1\ NA_1{}^1\ M$ revolves about its major axis it will generate a prolate ellipsoid of revolution. (In this application the word "ellipsoid" will be understood to mean "prolate ellipsoid of revolution".) If the remote focus of the generating ellipsoid moves along the arc $F_4{}^0\ F_1{}^1\ F_4{}^1$, while holding a constant length of major axis, the family of ellipsoids thus defined will lie within the exterior bounding surface hereinafter to be known as a "conoloid". The term "hemi-conoloid" will refer to either half of a conoloid as such would be divided by the median vertical plane $F_4{}^0\ A_1\ F_4{}^1$. Consider any ellipsoid $A_2\ N_2\ A_2{}^1\ M_2$ of the family of ellipsoids and pass a plane through the exterior transverse line $F_2{}^2\ F_1{}^2$ to include the radial line $F_1{}^2\ F_2{}^1$, which contains the remote focus of said ellipsoid, intersecting the said ellipsoid in the ellipse $T_2 O_2 T_2{}^1 P_2$. Since this conic section is a portion of said ellipsoid, it may be considered as being a surface of infinitesimal width which will combine with ellipses taken in a similar manner from the family of ellipsoids, having fixed principal focus ($F_1$), fixed length of major axes ($A_2 A_2{}^1$ equals $A_1 A_1{}^1$) and remote foci positioned along the arc $F_4{}^0 F_1{}^1 F_4{}^1$, to form the closed figure referred to above as the conoloid. Since it is a mathematical truth that the sum of the two focal distances, $F_1\ T_2$ plus $T_2\ F_2{}^1$, is constant and equals the major diameter of the ellipsoid, and since $F_2{}^1$ lies on the arc of a circle about $F_1{}^2$ as center, it follows that the sum $F_1\ T_2$ plus $T_2\ F_1{}^2$ is constant and the point $T_2$ lies on the arc of an ellipse whose foci are $F_1\ F_1{}^2$.

Similarly, the arc $F_4{}^0\ T_1{}^1\ T_2{}^1\ F_4{}^1$ is a hyperbola with foci at $F_1$ and $F_1{}^2$.

The line $T_2T_2^1$ is also the major diameter of the ellipse, $T_2$ $P_2$ $T_2^1$ $O_2$ which the plane whose trace is $F_1^2$ $T_2$ cuts on the ellipsoid whose projection is $A_2$ $N_2$ $A_2^1$ $M_2$. The remote focus of the ellipse lies on the circular arc $F_4^0$ $F_1^1$ $F_4^1$. A corrolary then follows in which it may be stated that a conoloid is the surface which a pencil of planes intersects in arcs of a family of ellipses, the major axes lying in a median plane, the vertices lying respectively on an elliptical arc and a confocal hyperbolic arc, the remote foci lying on a circular arc, whose center is on the axis of the said pencil of planes and is the remote focus of the said confocal arcs.

Acting as a beam projector the conoloid is cut away forward of the arc $F_4^0$ $F_1^1$ $F_4^1$ to permit emission of reflected rays originating at $F_1$. Said reflected rays then follow the planes of the pencil and pass through the axis thereof, which is the remote transverse line. They cross within the reflector upon the said circular arc at the corresponding remote foci of their respective ellipsoids as shown in Fig. 3. The median, vertical plane, shown in Fig. 2 as the line $F_4^0 F_4^1$, divides the conoloid into two halves and, since the rays from the halves cross on the arc of the vertical circle, which is the locus of remote foci of the ellipsoids, said emitted rays lie on the opposite side of the median vertical plane from the side reflecting the same. For example, rays reflected from the left hand side of the conoloid will, on emergence, lie on the right hand side of the said median vertical plane.

By parting the conoloid on said median vertical plane and separating the planes of the two halves by a horizontal angle with center at the proximate focus $F_1$, the reflected rays therefrom can be made to overlap each other. This is illustrated in Fig. 12, where R shows the theoretical beam as reflected from the left hand hemiconoloid and L shows the beam as reflected from the right hand hemiconoloid. The amount of overlap is indicated by the letter P.

Figure 5:
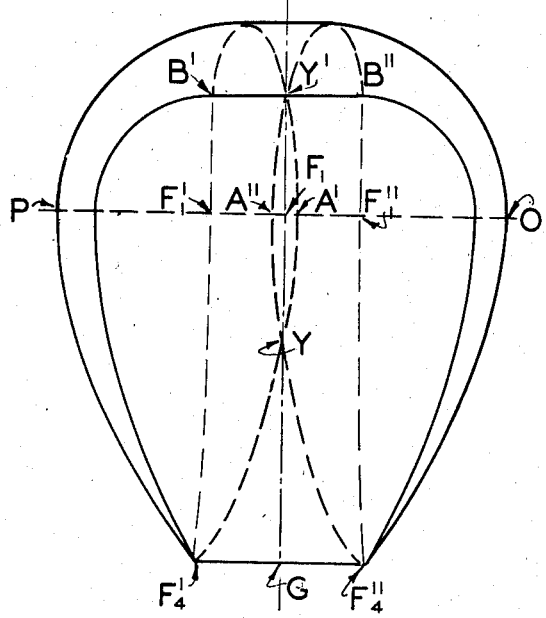
Fig. 5 is the front elevation, respectively, of a reflecting surface adapted to project light rays in a wide beam horizontally, but with the central portion intensified by super-imposing rays coming from one side of the reflector upon rays from the opposite side.

Figs. 4 and 5 illustrate a reflecting surface composed of the lower portion of two hemiconoloids superimposed with a hemi-ellipsoid whose proximate focus is likewise $F_1$, common to the conoloid. The angle 2C, between the median planes, has its vertex at $F_1$. The light rays represented by dash lines are shown to cross at $F_1^1$ and $F_1^{11}$, which lie on the lines $F_1^1$ $F_4^1$ and $F_1^{11}$ $F_4^{11}$ which are the loci of remote foci of the hemi-conoloids. In Fig. 12, P represents the amount which the two beams overlap, viz, angle 2C multiplied by the distance from the focus $F_1$ to the screen or object upon which the beam falls.

The horizontal angle 2C, Fig. 4, with vertex at $F_1$, is the projection of a solid or dihedral angle whose axis is a vertical line through $F_1$. By spreading the median planes through the angle 2C, that portion of the reflector forward of the focus $F_1$ will be separated by an opening shown as $F_4^1$ Y $F_4^{11}$, the point Y being vertically below $F_1$, while the portion rearward of $F_1$, represented by $A^1$ $YA^{11}$, will be an overlapping by the same angle 2C. The vertical plane through $F_1J$ will divide this portion and the duplicated corners can be eliminated.

The opening $F_4^1$ Y $F_4^{11}$ is filled with a reflecting surface whose profile will follow the elliptical arcs $F_4^1$ Y and $F_4^{11}$ Y.

Figure 6:
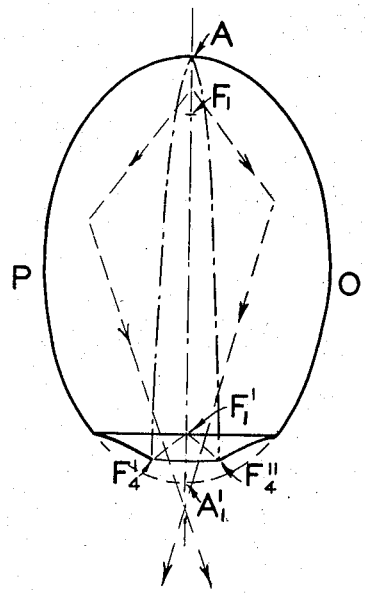
Fig. 6 is the plan view.
Figure 7:
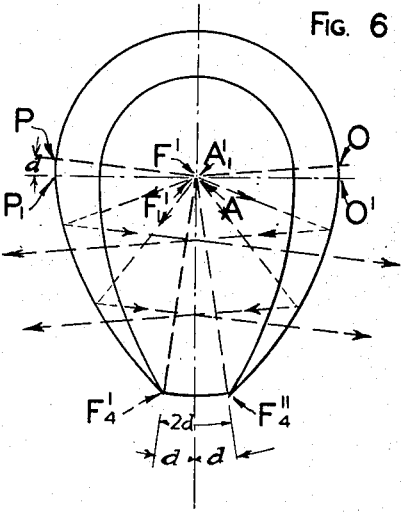
Fig. 7 is the front elevation, respectively, of a reflecting surface adapted to deflect the lateral portions of its wide beam downwardly.

If, however, the hemi-conoloids be separated by the dihedral angle, $2d$, whose axis is A $A_1^1$ in Figs. 6 and 7, the reflected rays will cross along the loci of remote foci $F_1^1$ $F_4^1$ and $F_1^1$ $F_4^{11}$ and the lateral beams will be inclined downwardly by the angular amount, $d$. The opening between the median planes of the hemi-conoloids will now be the angular part $F_4^1$ A $F_4^{11}$. To complete the reflecting surface, this angular part may be filled with a section from an ellipsoid whose axis is A $A_1^1$ and having arcuate sections equal to A $F_4^1$ and A $F_4^{11}$, or otherwise. The upper reflector may be the full hemi-ellipsoid, $P_1$ A $O_1$, or the segment P A O. In the first case the segments P A $P_1$ and O A $O_1$ would be removed from the hemi-conoloids.

To obtain a reflector which will give a beam both with an overlapping central portion and depressed lateral portions, a combination of the horizontal and vertical dihedral angles of separation of the median planes is used, the overlapping central portion being obtained by the horizontal separation, angle 2C, Fig. 4, and the lateral depression being obtained by rotating the median planes of the hemi-conoloid outwardly through the angles $d, d$. See Fig. 7. This construction is embodied in the lamps of Figs. 8 and 9, and produces beams of the character shown in Figs. 13 and 14. The combined rotation about the horizontal and vertical axes through the common proximate focus results in the median planes of the hemi-conoloids forming a dihedral or solid angle, the vertex of which passes through the proximate focus of the hemi-conoloids and is inclined in both horizontal and vertical directions. In other words, when the axis of rotation of the two hemi-conoloids passes through the common proximate focus and is inclined to the vertical, the beam therefrom will be both overlapped laterally and be deflected below the horizontal plane.

Figs. 4 and 5 also show the angular displacement of two halves of the hemi-ellipsoidal reflecting surface. This is denoted by the letters $B^1$ $Y^1$ $B^{11}$ and is filled with a reflecting surface which conforms to the profiles of the two intersecting elliptical arcs. In this construction the proximate focus $F_1$ remains fixed, while the remote foci, $F_1^1$ and $F_1^{11}$, of the ellipsoidal sections are separated by the arc 2C, Fig. 4. The arrows therefrom indicate the overlapping beams from the two reflecting surfaces.

While Figs. 4, 5, 6 and 7 show the reflecting surface with a hemi-ellipsoid as upper half in combination with the lower part of a conoloid, the use of said hemi-ellipsoid is not essential to the proper functioning of the reflector. This form is used in certain types of vehicle headlamps to project all of the rays below the horizontal. The hemi-ellipsoid used is the upper half $A_1 MA_1^1$ of the generating ellipsoid $A_1 MA_1^1 N$, Fig. 1.

Figs. 15 and 16 show the full conoloid used as a reflecting surface, the two lateral halves being separated and rotated in opposite directions through the angles $d$, $d$, the axis of rotation being the main axis $F_1 F_1^1$. The broken lines show the paths of the reflected rays. The angular space $F_4^1 A_1 F_4^{11}$ is filled with the reflecting section defined by the two arcs $A_1 F_4^1$ and $A_1 F_4^{11}$. The upper overlapping apices $A_1 KHF_4^0 A_1$ and $A_1 KHF_4^{01} A_1$ of the intersecting hemi-conoloids are removed, the two surfaces meeting along the arc $A_1 KH$.

Figs. 12, 13, and 14 illustrate the appearance of a theoretical beam of light upon a nearby screen, the three forms representing some of the variations obtained by separating the hemi-conoloids with various dihedral angles, the vertex passing through the proximate focus. In Fig. 12 the dihedral vertex is vertical and the overlapped portion P is horizontal and central. In Fig. 13 the dihedral vertex is inclined to the vertical on the line of the median vertical plane, resulting in a symmetrical overlapping P and deflection $d$ of the lateral beam. In Fig. 14 neither overlap P nor lateral depressions $d_1$ and $d_2$ are symmetrical about the longitudinal plane, due to unequal anglar displacements of the two hemi-conoloids.

As a manufactured article it is necessary to form the reflector in sections in order to press and polish the ellipsoidal and conoloidal surfaces. It is convenient to part the upper and lower portions on the horizontal plane through the longitudinal axis and, further, to part the lower section on the vertical plane through the longitudinal axis. Figs. 8 and 9 illustrate this construction. Companion flanges D D are formed on the upper, U, and lower, S and T, sections along the principal horizontal plane $PF_1O$ and companion flanges E E are formed on each of the lower sections S and T. Suitable means of binding the separate sections are incorporated, some of which are shown herewith. The horizontal flanges D D also provide a means of holding the reflector in its housing. A shelf, a portion of which is shown at Z, Fig. 9, is part of the outer casing or housing and extends around the central contour of the body. Holes X, are perforated in the flanges of the reflector to register with holes in the shelf. Spring locating and holding means are shown at 3 and 4 which lock the parts together under spring tension. These consist of bails with shoulders 5 and hooks 6 which pass through the holes X. Bails 3 and 4 are adapted to be held together as shown in Fig. 10 by the ring 7 which is part of one of the bails.

The vertical flanges, E E, are held together by tongues V which register through the slots W shown in Figs. 9 and 11. These tongues are seen to be portions of the flanges, and are cut and bent up at right angles to the flanges, the two halves of the reflector being then united and the tongues bent down as shown in Fig. 11 to hold the flanges in rigid contact. This may also be accomplished with rivets, screws, or other locking means.

In Figs. 8 and 9, I show an opening or orifice at Q. This permits the admission of a socket for a light bulb, exterior means being provided to adjust the filament thereof to its position at the proximate focus $F_1$.

Various changes in the construction and arrangement of the several parts herein shown and described may be employed, without departing from the spirit of my invention as disclosed in the appended claims.

And, while I have discussed only the projection of light waves, I wish to point out that the reflectors herein described may also be used for the projection of both sound waves and heat waves.

Having thus described my invention, what I claim as new and desire to secure by Letters Patent is:

1. A reflector whose surface on opposite sides of the vertical median planes is composed of diminishing elliptical arcs which lie on planes converging to a remote transverse line which passes through the exterior remote foci of the vertical elliptical arcs defining said median planes, and the vertical median planes being angularly displaced, with a line through the common proximate focus as axis of rotation, and the opposite sides being joined together transversely with a reflecting surface.

2. A reflector whose surface on opposite sides of the median planes is composed of diminishing elliptical arcs which lie on planes converging to remote deflected transverse lines which intersect each other at the common exterior remote focus of the elliptical arcs defining said median planes, the median planes being angularly displaced with relation to each other, by partial revolution, with the major axis of the principal ellipse as axis of revolution, and the opposite sides being joined together transversely with a reflecting surface.

3. A reflector whose surface on opposite sides of the median planes is composed of diminishing elliptical arcs which lie on planes converging to remote deflected transverse lines which intersect each other and terminate at the exterior remote foci of the elliptical arcs defining said median planes, the planes of the opposite similar elliptical arcs being declined downwardly toward each other; and the opposite sides of the reflector being joined together with a section of an ellipsoid of revolution formed by revolving the elliptical arc of the median plane about its axis.

4. A reflector whose surface is composed of diminishing elliptical arcs parted on the median vertical plane, which is the locus of the major axes of the elliptical arcs, each half being then angularly displaced with relation to each other by partial revolution with the major axis of the principal ellipse as axis, and partial revolution with a line through the proximate focus of said main ellipse and perpendicular to the plane of the ellipse as axis; the opening thus formed being then closed by a transverse reflecting surface.

5. A reflector having a continuous surface formed with a narrow light-emitting aperture, said reflector being shaped to project rays from a common focus through foci on two circular arcs lying within said aperture and having a surface which is the locus of areas having a common proximate focus, and remote foci lying on fixed, intersecting, horizontal, transverse lines.

6. A reflector having a continuous surface formed with a narrow, light-emitting aperture, said reflector being shaped to project rays from a common focus to foci on two circular arcs within the aperture, and whose surface is the locus of elemental areas having a common proximate focus, and remote foci lying on two fixed, transverse, inclined lines.

7. A reflector formed in sections, means for retaining the sections together, comprising flanges on the meeting edges of the sections formed with apertures in register, and a pair of bail-shaped spring members straddling one of the sections and having their ends inserted in said openings and interlocked at their intermediate portions.

8. In combination, a metallic shell comprising an upper member of hemi-ellipsoidal form and a lower member divided on a median plane through the proximate focus thereof into two lateral members, each being portions of the lower halves of hemi-conoloids, having a proximate focus in common with each other and with the upper member, said hemi-conoloid portions being separated on their median planes by a dihedral angle, the angular space between said hemi-conoloid portions being filled with a section which conforms to the profiles of the hemi-conoloid portions.

9. A reflecting surface comprising a lower member which is a combination of the lower halves of two hemi-conoloids having a common proximate focus and having median planes separated by a dihedral angle, and an upper member consisting of two ellipsoidal sections, whose major axes intersect angularly at their common proximate focus, and a wedge shaped filler section whose longitudinal section conforms to the profiles of the parted ellipsoidal surfaces; said reflecting surface having a light-emitting aperture.

10. A reflector surface which comprises a surface generated by a series of ellipses which lie on non-parallel contiguous planes passing through a common remote transverse line, the vertices of said ellipses being disposed along the arcs of two conic sections whose planes and foci are coincident, whose proximate focus is situated at the principal focal point of said reflector and whose remote focus lies on the remote transverse line, the remote foci of said generating ellipses lying on the arc of a circle whose center is at the remote focus on the transverse line, the said reflecting surface being parted on its median vertical plane of symmetry and the angular displacement of each of said parted portions about the common principal focus, and a simple reflecting surface across the opening formed by the angular displacement of said parted portions and conforming thereto, whereby a reflector is provided for producing a narrow beam whose distribution is governed by the angular displacement of said separated portions.

11. A reflector having a principal focus and a surface which, on opposite sides of a dihedral angle whose vertex passes through said principal focus, consists of a family of ellipsoidal segments, the major axes whereof are of constant length, one focus being fixed at said principal focus, the other foci being disposed along a circular arc in a median plane, said segments being selected to form a continuous confocal surface, said dihedral angle disposing the median planes of the said outside portions in angular relation to a reference plane through said principal focus.

12. A reflector whose surface is the combination of complementary halves of confocal hemi-conoloids whose median rearward profile is elliptic, whose median forward profile is hyperbolic, and whose remote foci lie on a circular arc, said combination being on planes of a dihedral angle whose vertex passes through the focus common to said hemi-conoloid, said reflector having a light-emitting aperture.

WILLIAM G. WOOD.